(12) United States Patent
Tranquart et al.

(10) Patent No.: US 10,599,791 B2
(45) Date of Patent: Mar. 24, 2020

(54) METHOD AND DEVICE FOR DIGITAL RECONSTRUCTION OF AN ELEMENTARY VOLUME REPRESENTING A MICROSTRUCTURE OF COMPOSITE MATERIAL

(71) Applicant: SAFRAN, Paris (FR)

(72) Inventors: Bastien Tranquart, Antony (FR); Robin Mandel, Paris (FR)

(73) Assignee: SAFRAN, Paris (FR)

( * ) Notice: Subject to any disclaimer, the term of this patent is extended or adjusted under 35 U.S.C. 154(b) by 413 days.

(21) Appl. No.: 15/315,495

(22) PCT Filed: Jun. 1, 2015

(86) PCT No.: PCT/FR2015/051439
§ 371 (c)(1),
(2) Date: Dec. 1, 2016

(87) PCT Pub. No.: WO2015/185840
PCT Pub. Date: Dec. 10, 2015

(65) Prior Publication Data
US 2017/0154141 A1 Jun. 1, 2017

(30) Foreign Application Priority Data
Jun. 2, 2014 (FR) .................................... 14 54990

(51) Int. Cl.
*G06F 17/50* (2006.01)
(52) U.S. Cl.
CPC ...... *G06F 17/5018* (2013.01); *G06F 2217/44* (2013.01)
(58) Field of Classification Search
CPC .. G06F 17/5018; G06F 2217/44; G06F 17/50; G06T 17/10; G06T 19/20
See application file for complete search history.

(56) References Cited

U.S. PATENT DOCUMENTS

| 7,505,885 | B2 * | 3/2009 | Deobald | ............ | G06F 17/5018 428/304.4 |
| 2004/0193392 | A1 * | 9/2004 | Williams | ............ | G06F 17/5018 703/2 |

FOREIGN PATENT DOCUMENTS

| CN | 1732306 A | 2/2006 |
| CN | 1899219 A | 1/2007 |

OTHER PUBLICATIONS

Kim et al. "Voxel-based meshing and unit-cell analysis of textile composites" Int. Journal for Numerical Methods in Engineering, vol. 56, pp. 977-1006; doi: 10.1002/nme.594 [retrieved on Nov. 15, 2018]. Retrieved from <https://pdfs.semanticscholar.org/767e/dab50c8d000778edb8d50f05359336b3919f.pdf> (Year: 2003).*

(Continued)

*Primary Examiner* — Rehana Perveen
*Assistant Examiner* — Alfred H B Wechselberger
(74) *Attorney, Agent, or Firm* — Oblon, McClelland, Maier & Neustadt, L.L.P.

(57) ABSTRACT

The method including defining a volume element and packing the volume element with digital elements modelling fiber elements of the composite material, and extending longitudinally along a main axis, the packing including associating each digital element with a position in a plane in three-dimensional space and with an orientation of its main axis; and successively positioning each digital element in the volume element in compliance with the position and the orientation that are associated therewith, this positioning including putting the digital element into contact with a wall of the volume element and/or a previously-positioned digital element, and geometrically adapting the digital element to the wall and/or to the previously-positioned element with which it is in contact; a portion of a digital element being (Continued)

subjected to a deformation other than having its longitudinal axis inclined relative to the main axis of the digital element.

12 Claims, 5 Drawing Sheets

(56) References Cited

OTHER PUBLICATIONS

Pan et al. "Numerical generation of a random chopped fiber composite RVE and its elastic properties" Composites Science and Technology, vol. 68, pp. 2792-2798; doi: 10.1016/I.cornpscitech.2008.06.007 [retrieved on Nov. 15, 2018]. (Year: 2008).*

Jin, B. "3-D Numerical Simulation and Analysis of Complex Fiber Geometry RaFC Materials with High Volume Fraction and High Aspect Ratio based on ABAQUS PYTHON" [thesis] Rutgers, New Brunswick, NJ [retrieved on Nov. 14, 2018]. Retrieved from <https://rucore.libraries.rutgers.edu/rutgers-lib/33770/> (Year: 2011).*

Kim et al. "Voxel-based meshing and unit-cell analysis of textile composites" Int. Journal for Numerical Methods in Engineering, vol. u 56, pp. 977-1006; doi: 10.1002/nme.594 [retrieved on Nov. 15, 2018]. Retrieved from <https://pdfs.semanticscholar.org/767e/dab50c8d000778edb8d50f05359336b3919f.pdf> (Year: 2003).*

Pan et al. "Numerical generation of a random chopped fiber composite RVE and its elastic properties" Composites Science and Technology, vol. 68, pp. 2792-2798; doi: 10.1016/1.compscitech.2008.06.007 [retrieved on Nov. 15, 2018]. (Year: 2008).*

Jin, B. "3-D Numerical Simulation and Analysis of Complex Fiber Geometry RaFC Materials with High Volume Fraction and High w Aspect Ratio based on ABAQUS PYTHON" [thesis] Rutgers, New Brunswick, NJ [retrieved on Nov. 14, 2018]. Retrieved from <https://rucore.libraries.rutgers.edu/rutgers-lib/33770/> (Year: 2011).*

Thomas et al. "Representative volume element of anisotropic unidirectional carbon-epoxy composite with high-fibre volume fraction" Composites Sci and Tech, vol. 68, pp. 3184-3192 [retrieved on Nov. 15, 2018]. Retrieved from <https://www.sciencedirect.com/science/article/pii/50266353808002753> (Year: 2008).*

Melro et al. "Generation of random distribution of fibres in long-fibre reinforced composites" Composites Science and Technology, vol. 68, pp. 2092-2102 [retrieved on Nov. 14, 2018]. Retrieved from <https://www.sciencedirect.com/science/article/pii/S0266353808001048> (Year: 2008).*

Jin, B. "3-D Numerical Simulation and Analysis of Complex Fiber Geometry RaFC Materials with High Volume Fraction and High Aspect Ratio based on ABAQUS PYTHON" [thesis] Rutgers, Graduate School [retrieved on Nov. 14, 2014]. Retrieved from <https://rucore.libraries.rutgers.edu/rutgers-lib/33770/> (Year: 2011).*

Long et al. "Modelling the geometry of textile reinforcements for composites: TexGen" Woodhead Publishing Series in Composites Science and Engineering, pp. 239-264 [retrieved on Nov. 14, 2018]. Retrieved from <https://www.sciencedirect.com/science/article/pii/B9781845699659500086> (Year: 2011).*

Leclerc et al. "Influence of morphological parameters of a 2D random short fibre composite on its effective elastic properties" 21st French Mechanics Congress, Bordeaux [retrieved on Nov. 14, 2018]. Retrieved from <https://www.mechanics-industry.org/articles/meca/abs/2013/05/mi130061/mi130061.html> (Year: 2013).*

Weissenbock et al. "FiberScout: An Interactive Tool for Exploring and Analyzing Fiber Reinforced Polymers" IEEE Pacific Visualization Symposium, Mar. 2014; doi: 10.1109/PacificVis.2014.52 [retrieved on Nov. 14, 2018]. Retrieved from <https://ieeexplore.ieee.org/document/6787162> (Year: 2014).*

Sherburn, M. "Geometric and Mechanical Modelling of Textiles" [thesis] University of Nottingham, pp. 68-89 [retrieved on Nov. 14, 2018]. Retrieved from <http://eprints.nottingham.ac.uk/10303/1/thesis-final.pdf> (Year: 2007).*

Luchoo et al. "Macro-scale Modelling of Discontinuous Fibre Composites" 18th Int Conf on Composite Materials [retrieved on Nov. 14, 2018]. Retrieved from <http://www.iccm-central.org/Proceedings/ICCM18proceedings/data/2.%20Oral%20Presentation/Aug26(Friday)/F10%20Multi-scale%20Modeling%20II/F10-4-1F0> (Year: 2011).*

Lomov et al. "Textile composites: modelling strategies" Composites: Part A, vol. 32, pp. 1379-1394 [retrieved on Dec. 4, 2019]. Retrieved from <https://www.sciencedirect.com/science/article/pii/S1359835X01000380> (Year: 2001).*

Zeng et al. "Geometrical modelling of 3D woven reinforcements for polymer composites: Prediction of fabric permeability and . . . " Composites: Part A, vol. 56, pp. 150-160 [retrieved from Dec. 4, 2019]. Retrieved from <https://www.sciencedirect.com/science/article/pii/S1359835X13002704> (Year: 2013).*

International Search Report dated Aug. 28, 2015 in PCT/FR2015/051439 filed Jun. 1, 2015.

Yi Pan et al., "Numerical generation of a random chopped fiber composite RVE and its elastic properties", Jun. 12, 2008 (published online), Composites Science and Technology, vol. 68, pp. 2792-2798, XP025474509.

M. Bailakanavar et al., "Automated modeling of random inclusion composites", Engineering with Computers, Dec. 21, 2012 (published online), vol. 30, pp. 609-625, XP055167682.

W. Leclerc et al., "Influence of morphological parameters of a 2D random short fibre composite on its effective elastic properties", 21$^{eme}$ Congres Francais de Mecanique, 2013, 6 pages, XP055208771.

Office Action and Search Report dated Feb. 1, 2019 in the corresponding Chinese Application No. 2015800365200 with English Translation and Translation of Category of Cited Documents citing documents AO and AP therein 20 pages.

* cited by examiner

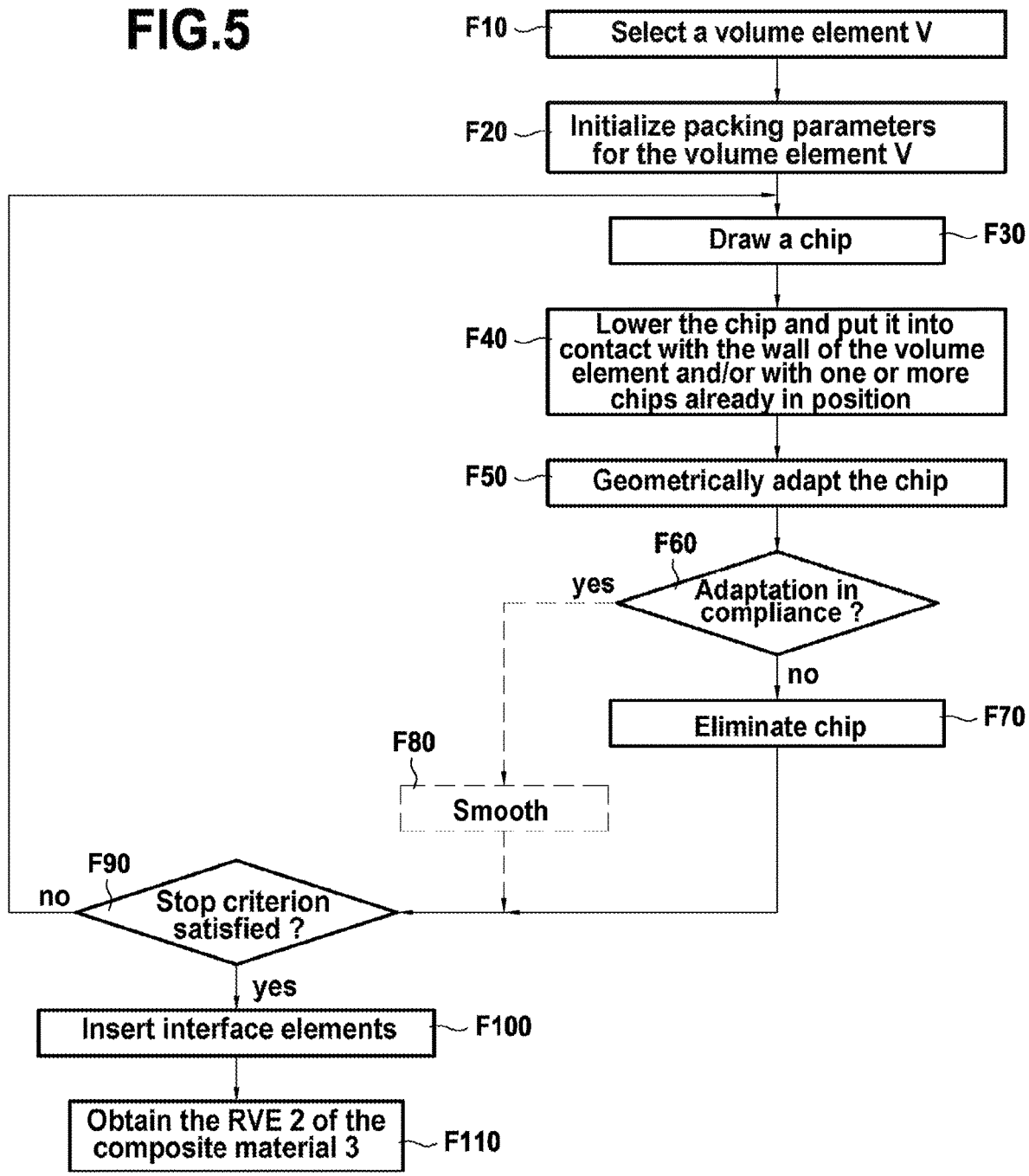

METHOD AND DEVICE FOR DIGITAL RECONSTRUCTION OF AN ELEMENTARY VOLUME REPRESENTING A MICROSTRUCTURE OF COMPOSITE MATERIAL

BACKGROUND OF THE INVENTION

The invention relates to the general field of digital modelling.

More particularly, it relates to a method of digitally reconstructing a representative volume element (or RVE) of the microstructure of a composite material, such as for example a composite material having discontinuous long fibers (also known as discontinuous fiber composites (DFCs)) manufactured from "chips" of fibers (e.g. of glass, carbon, etc.) tangled together randomly and pre-impregnated with a thermosetting or thermoplastic resin, also known as a "matrix".

Such composite materials are particularly well adapted to making parts of complex shape (e.g. including ribs or projections), such as those used in particular in the aviation industry or in numerous other mechanical engineering industries. Such parts are fabricated in known manner from preforms that are cut out from a sheet of material made up of tangled fiber chips, and then assembled in a mold where they are subjected to a thermocompression cycle. The chips may also be inserted in the mold before thermocompression.

The performance of such composite materials depends directly on the tangling of the fiber chips, and suffers from a high degree of variability due to the random nature of the microstructure (or "geometry") of the composite material at chip scale.

In order to take account of the influence of the microstructure of the composite material (which can vary from one point to another of a part) on the behavior of that part, various multiscale analysis methods are presently in use in industry to predict the mechanical properties at any point of a part as a function of the characteristics of the constituents of the composite material and as a function of their local arrangement. Such multiscale analysis methods make it possible to estimate macroscopic homogeneous properties on the basis of the average response of a representative volume element RVE of the microstructure of the material, i.e. on the basis of a geometrical entity that is statistically representative (i.e. that models) the microstructure of the composite material.

Such methods are also known as "homogenizing" methods. They are in contrast to conventional simulation models in which the behavior of the composite material is assumed in advance (a law governing macroscopic behavior is identified by testing).

In the state of the art, there are several homogenizing methods that make it possible to go from a microscopic scale to a macroscopic scale. The document by P. Kanouté et al. "Multiscale methods for composite", Arch. Comput. Methods Eng., 2009, 16, pp. 31-75 proposes in particular a digital method using finite elements and having its main steps set out in FIG. 1.

In that method, a representative volume element RVE of the microstructure of the composite material is initially reconstructed (step E10) from characteristic data of the microstructure, e.g. extracted from three-dimensional (3D) images obtained by microscopy or by tomography, or from a predefined mathematical model for generating structures.

The volume as reconstructed in this way is then discretized (step E20) using a conventional finite element method, during which the volume is subdivided into a mesh of finite elements.

Thereafter, the resulting meshed volume is subjected to various predefined loading situations (e.g. shear, traction, etc.) (step E30) and its average response to such loading is estimated, e.g. by performing a finite element calculation (step E40). Homogenized properties of the composite material part are deduced from the response (step E50).

One of the main difficulties with that approach lies in the RVE digital reconstruction step E10 and the discretization step E20, in particular for composite materials such as DFCs (based on discontinuous long fibers) that are fabricated from random tangling of preimpregnated fiber chips and that present a high fiber volume packing ratio. Those steps are based on a priori knowledge of the shape, the geometry, and the positions of the reinforcing fiber elements of the composite material and then on how they pack a predetermined volume in compliance with that shape, that geometry, and those positions.

In the present state of the art, there exist several methods of digitally reconstructing an RVE of composite material.

A first method relies on randomly drawing a plurality of rigid (i.e. undeformable) geometrical shapes in the volume element in order to model the tangled reinforcing fiber elements of the composite material. Each time a new fiber element is drawn, it is not allowed to enter into collision with nor to interpenetrate a fiber element that has already been positioned in the volume, and some minimum distance is imposed between neighboring fiber elements. Although that first method can be implemented quickly, it can nevertheless be understood that the resulting fiber volume packing ratio is very small; typically it does not exceed 40%, which is not representative of reality in the composite materials under consideration.

To mitigate that drawback, one solution consists in performing additional draws of equivalent geometrical shapes but of sizes that are progressively reduced. That solution combined with the preceding solution makes it possible to obtain a packing ratio of about 80%. Nevertheless, such a technique is not pertinent for certain composite materials, and in particular for composite materials having long discontinuous fibers in which the reinforcing fiber chips are of similar sizes relative to one another.

R. Luchoo et al. propose, in a document entitled "Three-dimensional numerical modelling of discontinuous fiber composite architectures", $18^{th}$ International Conference on Composite Materials, pp. 356-362, 2011, a second method that is more particularly intended for DFC materials. That second method relies on modelling the tangling of the chips by using chips that are flexible in two-dimensions, corresponding to areas. The shape of the chips is controlled by a set of pilot nodes. Interpenetration is thus generated by using attraction/repulsion algorithms directly on the pilot nodes in order to obtain an optimum solution. The surfaces of the chips are then embedded in a mesh of the volume element. Interpenetration and spacing between the chips within the volume element are therefore not managed strictly.

That second method is thus remote from reality and is not directly usable for predicting failure involving interlaminar stresses at the surfaces of the chips, since the method does not enable them to be evaluated.

A third method is described in a document by Y. Pan et al. entitled "Numerical generation of a random chopped fiber composite RVE and its elastic properties", Composite Science and Technology 68, pp. 2792-2798, 2008.

That third method relies on randomly drawing same-sized fiber elements in the form of right elliptical cylinders (i.e. strands) that are piled to pack a resin volume element. In that third method, when an intersection is detected between a new fiber element and a fiber element already in position in the volume element, the new fiber element is deformed, and more precisely it is deformed into a single "U-shaped and square-cornered bend" (or "rectangular bend")(i.e. it is curved with both ends sloping in symmetrical directions) in order to take account of the presence of the element that is already in position. Pan et al. thus take two types of fiber element into consideration for packing the volume element, namely straight fiber elements and bent fiber elements, where bent elements are not representative of reality.

The inclination of a fiber element is initially modelled in two dimensions (2D) in a longitudinal plane of the fiber element, as shown diagrammatically in FIG. 2. In this figure, references A and B designate two initially straight fiber elements characterized by a point of intersection IB situated in the fiber layer FL-INF occupied by the element B. In application of the 2D modelling used, the point IB is moved vertically in translation to a point IA situated at the level of the higher fiber layer FL-SUP. The fiber layers FL-INF and FL-SUP are separated by a layer of resin ML. Two additional points S1 and S2, and respectively S1' and S2', are added on either side of the point IA in the fiber layers FL-SUP and FL-INF in order to model the inclination of the fiber element A. The elliptical section of the fiber element is kept unchanged. The points S1, S2 and S1', S2' are also selected so as to guarantee some minimum spacing between the fiber elements within the volume. The inclined fiber element A is then reconstructed in three dimensions (3D) by sweeping the space around its longitudinal axis.

In order to facilitate discretization of the representative volume element (RVE) reconstructed using that third method, and more generally in order to facilitate implementing it, large amounts of space are taken into consideration between the piled fiber elements, thereby limiting the packing ratio that can be obtained for the RVE using that method.

There therefore exists a need for a method of digitally reconstructing a representative volume element of a composite material that leads to a high packing ratio and that can be adapted to various types of composite material, and in particular to DFC materials.

OBJECT AND SUMMARY OF THE INVENTION

The present invention serves in particular to satisfy this need and it proposes a method of reconstructing a representative volume element of a composite material that recreates the random tangling of the fiber chips while ensuring a high packing ratio (typically greater than 90%), and making it possible to predict the mechanical properties of the material by digital homogenization.

The invention thus applies in preferred but non-limiting manner to DFC materials. Nevertheless, it may be applied to other types of composite material, such as for example bulk molding compound (BMC) materials or sheet molding compound (SMC) materials obtained using a polyester resin reinforced by cut glass fibers as are commonly used in the automotive and electrical industries.

More precisely, the invention provides a method of digitally reconstructing a representative volume element of microstructure of a composite material, the method comprising:

a definition step for defining a volume element; and
a packing step for packing the defined volume element with a plurality of digital elements modelling fiber elements of the composite material, each digital element extending longitudinally along a main axis, this packing step comprising:
  an association step for associating each digital element with a position in a determined plane in three-dimensional space and with an orientation of its main axis in that plane; and
  a positioning step for successively positioning each digital element in the volume element in compliance with the position and the orientation that are associated therewith, this positioning step comprising putting the digital element into contact with at least one wall of the volume element and/or at least one previously-positioned digital element, and geometrically adapting the digital element to said at least one wall and/or to said at least one previously-positioned digital element with which it is in contact;
at least a portion of a digital element used for packing the volume element being subjected during the geometrical adaptation to a deformation other than having its longitudinal axis inclined relative to the main axis of the digital element.

Correspondingly, the invention also provides a device for digitally reconstructing a representative volume element of microstructure of a composite material, the device comprising:
a definition module for defining a volume element; and
a packing module suitable for packing the defined volume element with a plurality of digital elements modelling fiber elements of the composite material, each digital element extending longitudinally along a main axis, the packing module being suitable for:
  associating each digital element with a position in a determined plane in three-dimensional space and with an orientation of its main axis in that plane; and
  successively positioning each digital element in the volume element in compliance with the position and the orientation that are associated therewith, the packing module being suitable during this positioning for putting the digital element into contact with at least one wall of the volume element and/or at least one previously-positioned digital element, and for geometrically adapting the digital element to said at least one wall and/or to said at least one previously-positioned digital element with which it is in contact;
at least a portion of a digital element used for packing the volume element being subjected during the geometrical adaptation to a deformation other than having its longitudinal axis inclined relative to the main axis of the digital element.

The term "geometrical adaptation" is used in the meaning of the invention to indicate that the shape of the digital element in question is modified where appropriate so as to adapt the digital element under consideration to the pattern of said at least one wall and/or of said at least one previously-positioned digital element with which it has been put into contact.

In other words, during the step of positioning each digital element in the volume element, the shape of the digital element is adapted to take account geometrically of the contact between the digital element and the previously-positioned digital elements and/or the walls of the volume element. In particular, the shape of the digital element is adapted to the already-positioned elements that come into contact with all or part of the digital element and that lie below it, and/or to the bottom wall of the volume element (i.e. the wall at the bottom of the volume on which the elements are being positioned).

The reconstruction method proposed by the invention thus consists in progressively packing a volume with fiber elements of predetermined shape (e.g. chips in the shape of rectangular parallelepipeds) that are put into contact with one another and that are not rigid but, on the contrary, that have the ability to adapt "naturally" and realistically to the pile of fiber elements already in place. Advantageously, this putting into contact and geometrical adaptation of the fiber elements is effective in limiting the presence of voids between the fiber elements positioned in the volume. For this purpose, the invention is not limited to deforming the fiber elements in a section orthogonal to the longitudinal axis of these elements, as in the prior art (in other words to inclining the longitudinal axis of the fiber elements in a single direction orthogonal thereto), but also makes other deformations possible, such as for example turning the main axis of the fiber element over certain portions, etc. No limit is imposed a priori on the type of deformation that can be envisaged. In particular, the section of a digital element may change shape freely, unlike in the prior art. It is thus possible to reach fiber volume packing ratios close to 100%.

By means of this method, it is thus possible to create volume elements that are representative of different composite material structures, and in particular of DFC structures which have a high fiber volume packing ratio. These RVEs can then be associated in conventional manner using finite element calculation to estimate the responses of the microstructures as modelled in this way to various types of mechanical loading (shear, traction, etc.). The invention thus provides a tool making it easy to estimate the relationship between real microstructures of composite materials and the mechanical properties as measured when loading such microstructures.

It also makes it easier to analyze the causes of variability in mechanical performance as observed on parts and/or on test pieces, in particular scale effects, e.g. by considering and comparing a plurality of representative volume elements of the same composite material as reconstructed by the invention.

It should be observed that the invention is not limited to a particular shape of fiber element, e.g. such as chips of rectangular parallelepiped shape. Consequently, the invention also provides a tool for optimizing the fabrication of composite materials by making it easy to evaluate different shapes, dimensions, and types of fiber elements.

In a particular implementation, the reconstruction method comprises a discretization step for discretizing the volume element and each digital element in uniform manner into a plurality of voxels.

As a result, the invention serves simultaneously to reconstruct and to discretize the RVE.

This discretization step is preferably performed prior to packing the defined volume element. As a result, a digital element can advantageously be put into contact and geometrically adapted by processing each voxel of the digital element separately (e.g. the voxels are processed independently of one another), thereby making these operations easier to implement. Specifically, this avoids having any recourse to complex geometrical considerations for adapting the shape of a digital element to the pattern of the wall or of the digital elements previously positioned in the volume element, while making it possible to minimize voids between the elements. Geometrical adaptation may be performed voxel by voxel, thereby providing a wide range of potential deformations for each digital element, which deformations would otherwise be difficult if not impossible to model digitally.

In a variant, the RVE may be discretized after it has been reconstructed, e.g. by subdividing it into finite elements, as is known to the person skilled in the art.

In a particular implementation, the geometrical adaptation comprises positioning at least two subsets of voxels of the digital element in planes in three-dimensional space that are vertically offset relative to each other.

These planes in three-dimensional space are preferably parallel to the determined plane of that space that is under consideration during the association step, this determined plane possibly being selected to be parallel to the bottom wall of the volume element on which the digital elements are positioned. These planes may be separated by one or more voxels in order to adapt to various configurations of piles of digital elements. In addition, it is possible to envisage positioning subsets of voxels in more than two distinct planes in three-dimensional space so as to adapt the digital element to the pattern made up by a plurality of digital elements.

For example, a first plane in three-dimensional space in which a first subset of voxels of the digital element under consideration is positioned is a plane situated above voxels of an already-positioned digital element on which the digital element in question has come into contact, and a second subset of voxels of the digital element is positioned in a second plane in three-dimensional space presenting empty voxels, in other words voxels that are not occupied by an already-positioned digital element or by the wall of the volume element, thus making it possible to make a more realistic model of the deformation of a portion of the digital element (the digital elements remain distinct from one another after they have been positioned in contact with one another). For example, at least one voxel of a said subset may be in contact with a voxel of a digital element that has already been positioned or with the wall of the volume element.

As a function of the length of the portion(s) of the digital element subjected to deformation and as a function of the already-positioned elements and/or of the wall of the volume element, it is possible to envisage positioning a plurality of voxels of the digital element in a plurality of planes that are vertically offset from the first plane (in particular lying under the first plane), or on the contrary in a single plane.

In order to identify at least one plane in three-dimensional space in which a said subset of voxels is positioned, the method preferably includes a step of verifying that there exists at least one voxel in this plane that is vertically in alignment with a voxel of said subset and that is not occupied by a voxel of a previously-positioned digital element or by the wall of the volume element.

In a particular implementation, the method further includes an insertion step of inserting at least one link voxel between the two subsets of voxels.

Inserting this link voxel makes it possible to preserve continuity of the fiber element in spite of the deformation to which it is subjected (i.e. there is no break of the fiber element as a result of it being deformed). This makes it possible to obtain a more realistic representative volume element of the microstructure of the composite material by representing the various force "paths" present in the material as a result of the fiber element being tangled.

Nevertheless, inserting one or more link voxels artificially increases the length of the fiber element under consideration, which may have an influence on the response of the RVE to the various loadings to which it is subjected. Thus, in a particular implementation, if the planes in three-dimensional space happen to be vertically offset by a number of voxels that is greater than a predetermined number, the digital element is eliminated from the volume element, in other words the digital element is not taken into account for packing the volume element.

It should be observed that a void may result from eliminating this digital element and that no subsequently-drawn digital element can fill this void. This void will become associated with resin when loading the RVE.

In addition, this implementation makes it possible indirectly to control the content of out-of-plane fibers (whereas during the association step, it is the angle in the plane of the various digital elements that is controlled).

In another implementation of the invention, the method further includes a smoothing step for smoothing the surface of at least one digital element put into contact with a previously-positioned digital element in the volume element and having at least a portion that has been subjected to deformation during the geometrical adaptation, the smoothing being performed at the deformation.

By way of example, when the digital element is discretized into a plurality of voxels, the smoothing comprises truncating at least one voxel of said at least one portion that has been subjected to deformation (or of the portion together with one or more link voxels), the voxels being truncated on a diagonal plane thereof.

This truncation step makes it possible to obtain a model that is closer to the physical reality of the microstructure by coming closer to the real shape of the fiber element after deformation and by limiting the stress concentration caused by out-of-plane fibers.

In another implementation, the method further includes a step of post-processing the volume element comprising inserting an interface element of predetermined dimensions between at least two contacting digital elements in the volume element.

These interface elements are preferably of small thickness. They make it possible to model phenomena of loss of cohesion between the fiber elements.

For this purpose, while the RVE is being loaded, they are given particular properties that make it possible to simulate failure, if any, of the composite material, e.g. under the effect of shear in the plane. These particular properties may be close to the properties of resin, and they may be adapted so that the estimate of the response of the RVE is as close as possible to the response of any real sample. These particular properties are preferably isotropic.

In a particular implementation, the positions associated with the digital elements during the association step are selected to have uniform spatial distribution, this uniform distribution being adjusted on detecting a predetermined event as a function of the spatial distribution of the previously-positioned digital elements.

By way of example, the event that might trigger an adjustment of the distribution of positions associated with the digital elements may be detecting that a number of positions situated in the same limited sector of three-dimensional space have been attributed in succession to different digital elements. Such an attribution can lead to difficulties in packing the volume element with the digital elements associated with those positions (presence of voids, vertical spacing between the subsets of voxels of a given digital element after geometrical adaptation greater than a predetermined threshold, etc.).

Adjusting the distribution makes it possible to return to a situation that is close to what happens physically when fabricating a composite material and thus to the tangling of the fiber elements within the material.

In a variant, it is possible to envisage a three-dimensional distribution that is different from a uniform distribution in order to allocate a preferred orientation to the digital elements.

In a particular embodiment, the various steps of the reconstruction method are determined by computer program instructions.

Consequently, the invention also provides a computer program on a data medium, the program being suitable for being performed in a reconstruction device or more generally in a computer, the program including instructions adapted to performing steps of a reconstruction method as described above.

The program may use any programming language, and it may be in the form of source code, object code, or code intermediate between source code and object code, such as in a partially compiled form, or in any other desirable form.

The invention also provides a computer readable data medium including instructions of a computer program as mentioned above.

The data medium may be any entity or device capable of storing the program. For example, the medium may comprise storage means, such as a read only memory (ROM), e.g. a compact disk (CD) ROM, or a microelectronic circuit ROM, or indeed magnetic recording means, such as a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from an Internet type network.

Alternatively, the data medium may be an integrated circuit in which the program is incorporated, the circuit being adapted for executing or for being used in the execution of the method in question.

BRIEF DESCRIPTION OF THE DRAWINGS

Other characteristics and advantages of the present invention appear from the following description made with reference to the accompanying drawings, which show an implementation having no limiting character. In the Figures:

FIG. 5 is a flow chart showing the various steps of the reconstruction method of the invention as performed by the FIG. 3 reconstruction device;

DETAILED DESCRIPTION OF THE INVENTION

Figure 3:
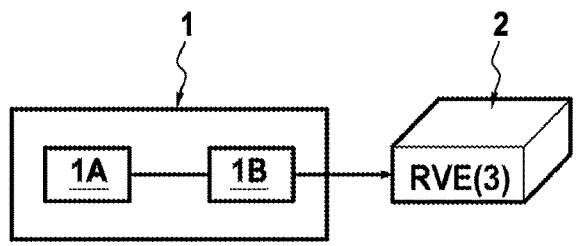
FIG. 3 shows a device for reconstructing a representative volume element of a composite material microstructure in accordance with a particular implementation of the invention.

FIG. 3 shows, in its environment, a device 1 for reconstructing a representative volume element (RVE) 2 of microstructure of a composite material in accordance with a particular embodiment of the invention. In known manner, a representative volume element of a composite material is a geometrical entity that is statistically representative of the microstructure of the composite material, i.e. that models the microstructure.

In the presently-described example, consideration is given to a composite material 3 of DFC type, in other words having discontinuous long fibers that is made from fiber chips that are randomly tangled and preimpregnated with a thermosetting resin (matrix). By way of example, the chips are chips of glass fiber or of carbon fiber impregnated with a carbon resin, and they are substantially in the shape of rectangular parallelepipeds.

Nevertheless, the invention is naturally applicable to other composite materials made up of fiber elements preimpregnated with resin.

As mentioned above, digitally reconstructing a representative volume element of the composite material 3 is advantageous insofar as it makes it possible to use digital homogenization methods as described above with reference to FIG. 1 for the purpose of estimating the mechanical and elastic properties at any point of the material and for the purpose of deducing its performance therefrom. Such performance depends directly on the tangling of the fiber chips during fabrication of the material.

Figure 4:
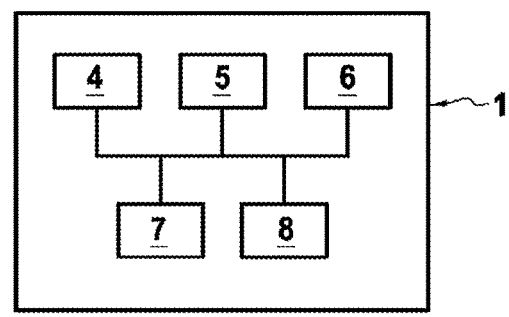
FIG. 4 is a diagram showing the hardware architecture of the FIG. 3 reconstruction device.

In the presently-described embodiment, the reconstruction device 1 is a computer of hardware architecture that is shown diagrammatically in FIG. 4.

In particular, it comprises a processor 4, memories 5-7 (e.g. a ROM and/or a hard disk 5, a random access memory (RAM) 6, and a non-volatile memory 7), and communication means 8. The communication means 8 comprise in particular input/output means (e.g. mouse, keyboard, screen, etc.) enabling a user or an operator to interact with the reconstruction device 1, e.g. in order to specify certain parameters. These means also include one or more communication interfaces (e.g. a universal serial bus (USB) port, a network card, etc.).

The ROM and/or the hard disk 5 constitute a data medium readable by the processor 4 of the reconstruction device 1 and storing a computer program in accordance with the invention including instructions for executing steps of a method of the invention for reconstructing an RVE of the microstructure of a composite material 3 of the invention, the steps of the method being described below with reference to FIG. 5 in a particular implementation.

In equivalent manner, the computer program defines functional modules of the reconstruction device 1 (specifically software modules), such as a module 1A for defining a volume element and a module 1B for packing that volume element in order to reconstruct the RVE 2. The functions of these two modules are described in detail with reference to the steps of the reconstruction method described below.

Figure 1:
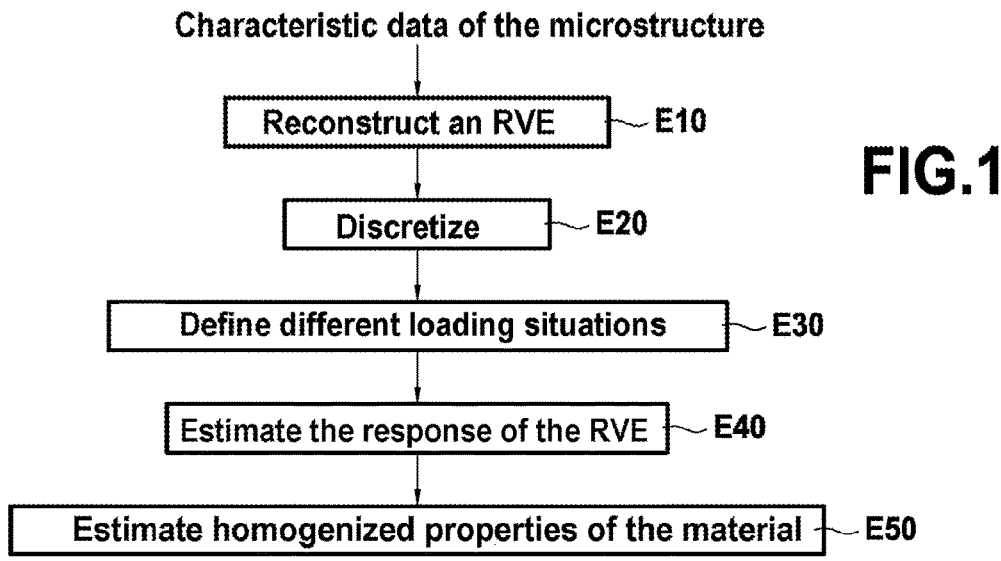
FIG. 1, described above, is a flow chart of a prior art homogenization method.
Figure 2:
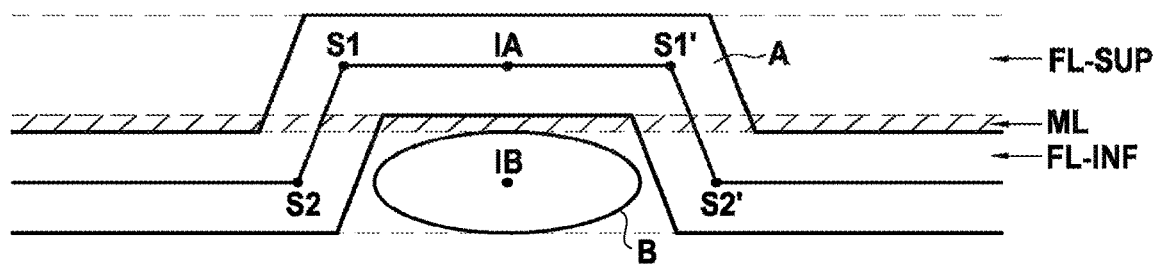
FIG. 2, described above, is a diagram showing a prior art method for reconstructing a representative volume element of a composite material.

FIG. 5 shows the main steps of a reconstruction method of the invention in a particular implementation in which they are performed by the reconstruction device 1 shown in FIG. 1 and lead to the representative volume element 2 of the composite material 3 being reconstructed.

In the description below, in order to illustrate the invention better, consideration is given to a three-dimensional reference frame written (X,Y,Z).

A volume element V for modelling the microstructure of the composite material is initially defined by the definition module 1A of the reconstruction device 1 (step F10). By way of example, this volume element V is defined from information supplied via the input/output means 8 of the reconstruction device 1 by a user or an operator, e.g. by the user making a selection from a set of predefined volume elements (e.g. cube, rectangular parallelepiped, cylinder, or other shapes that are more complex).

This definition step F10 consists not only in selecting the shape of the volume element V, but also in defining its dimensions. It is assumed herein that the volume element V is a rectangular parallelepiped having top and bottom walls that are selected to be parallel to the X,Y plane, for simplification purposes.

In a variant, it is possible to select a volume element that is not a parallelepiped, such as a portion of a sphere, of a cylinder, or of a wedge. The X,Y plane may also be selected in particular manner to give precedence to a particular orientation as a function of the surfaces of the volume. For example, it may be advantageous to evaluate a wedge having its X,Y plane running along the perpendicular to the bisector of the V-shape formed by the two main surfaces of the wedge.

The dimensions of the rectangular parallelepiped V need to provide a compromise between accuracy and complexity: they must be large enough to contain a large number of fiber elements so that the properties derived from the RVE 2 do indeed represent the real properties at macroscopic level of the composite material 3, while nevertheless leading to complexity that is acceptable for the operations and the calculations that are performed while reconstructing the volume element and while loading it.

In the presently-described implementation, the dimensions of the volume element V that satisfy such a compromise are determined beforehand by experiment, and they are stored in a memory of the reconstruction device (e.g. in the non-volatile memory 7) for use by the definition module 1A during the step F10 of defining the volume element V.

In a variant, these dimensions may be supplied by the user to the definition module 1A via the communication means 8.

In the presently-described implementation, the volume element V is then discretized in uniform manner in the form of a plurality of voxels, thereby producing a "grid" of voxels. Such a grid is shown in two dimensions in FIG. 6A(1), in the X,Z plane. The resolution used for the discretization of the volume element V (i.e. the size of the voxels) may be predetermined or it may be supplied by the user of the definition module 1A via the communication means 8 of the reconstruction device 1.

In accordance with the invention, the volume element V as defined in this way by the definition module 1A is packed with a plurality of digital elements C1, C2, . . . , CN that model the fiber chips of the composite material 3, where N is an integer greater than 1. In order to make the invention easier to understand, these digital elements are referred to interchangeably as "chips" or as "digital elements".

Figure 7:
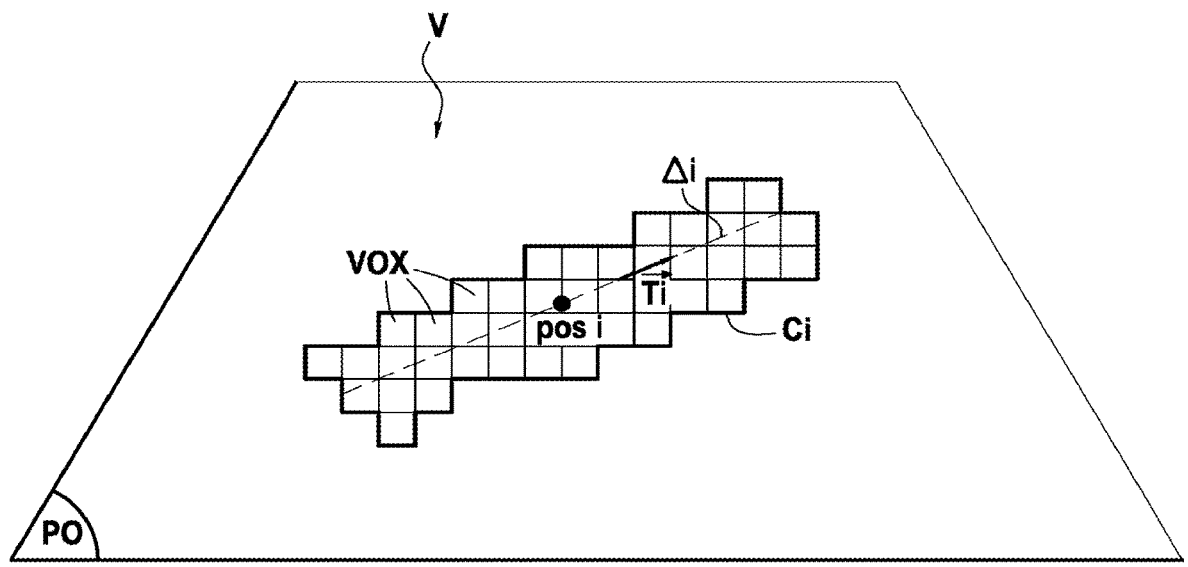
FIG. 7 shows a digital element in an X,Y plane of the space prior to being positioned in the volume element by the reconstruction device.

The digital elements C1, . . . , CN are selected in such a manner as to approach the shape of the fiber chip used for fabricating the composite material 3. In the presently-described example, and as shown in FIG. 7 in the X,Y plane, they are rectangular parallelepipeds discretized into a plurality of voxels. Each of the faces of a digital element Ci is constituted by an integer number of voxels VOX of the same size as the voxels of the volume element V so as to be easily incorporated in the grid that results from discretization of the volume element V. Each digital element Ci, i=1, ..., N extends along a "main" longitudinal axis Δi. This axis is selected to be parallel to the bottom wall of the volume element V, in other words the X,Y plane.

Prior to packing the volume element V with the digital elements C1, ..., CN, the definition module 1A proceeds to initialize various parameters for packing the volume element V (step F20).

In this example, this initialization comprises in particular defining and/or selecting the dimensions of each digital element Ci, i=1, ..., N modelling a fiber chip, namely its length, its width, and its thickness. In this example, these dimensions are selected to be identical for all of the digital elements. By way of example, it is assumed that each digital element modelling a chip has a thickness of one voxel, and predetermined length and width.

In a variant, by using the communication means 8, the user may select the width and/or the length and/or the thickness of the digital elements used for packing the volume element V, and/or may specify dimensions that are different for different digital elements.

In accordance with the invention, the volume element V is packed by piling up a plurality of digital elements C1, ..., CN modelling the fiber chips of the composite material 3. In order to model the random nature of the tangling of the fiber chip in the composite material, the positions of these digital elements in the X,Y plane, and their orientations in the same plane, are selected randomly while complying with a given distribution relationship.

Thus, the initialization step F20 also comprises:
defining an orientation tensor for the digital elements C1, ..., CN, or in equivalent manner a distribution relationship for the orientations of the various digital elements in the X,Y plane; and
defining a distribution relationship for the positions of the digital elements in the X,Y plane. In the presently-described example, the positions given to the digital elements in the X,Y plane are drawn randomly in a uniform distribution defined on the plane that characterizes the top wall of the volume element V. In the description below, this plane is written P0.

After the initialization step, the packing module 1B of the reconstruction device 1 proceeds to pack the volume element V.

For this purpose, the packing module 1B uses the above-mentioned plurality of digital elements Ci, i=1, ..., N, which it positions in succession in the volume element V while complying with predetermined positioning constraints or rules.

More specifically, and as shown in FIG. 7, the packing module 1B begins by associating each digital element under consideration Ci, i=1, ..., N, with a position POSi for its center in the plane P0 and with an orientation for its main axis Δi (defined by a vector $\vec{T_i}$) drawn randomly in application of the distribution relationship defined during the initialization step F20 (step F30).

Thereafter, the digital elements are positioned one by one in succession in the volume element V, while taking account of the digital elements that have already been positioned: in other words, when the packing module 1B positions a current digital element Ci, it takes account of the i−1 digital elements C1, ..., Ci−1 that have already been positioned in the volume element.

The current digital element CI is thus positioned in the volume element V in compliance with (i.e. at) the position POSi and with the orientation $\vec{T_i}$ that have been associated therewith (step F40).

In the presently-described implementation, this positioning involves iteratively vertically "lowering" (i.e. along the axis Z) the digital element Ci into the grid of voxels defining the volume element V at a predetermined descent (i.e. "lowering") step size. In this example, a descent step size is selected that is equal to one voxel at each iteration for greater accuracy.

This lowering is performed from the plane P0 until the current digital element Ci comes into contact with the bottom wall of the volume element V and/or with one or more digital elements Cj, j=1, ..., i−1 already positioned in the volume element V and lying beneath all or part of the digital element Ci. In the presently-described implementation, during this lowering, the voxels of the digital element are processed separately by the packing module 1B one by one (i.e. independently of one another) in order to facilitate positioning the digital element in the volume element V.

During this lowering, when the packing module 1B detects that a current digital element Ci comes into intersection with the bottom wall of the volume element V and/or with one or more digital elements previously positioned in the volume element V, it is configured in accordance with the invention to geometrically adapt the shape of the current digital element Ci to match the pattern of the items (wall or digital element(s)) with which it is in contact, for the purpose of packing the space available in the volume element V (step F50). In other words, the current digital element Ci is geometrically adapted to the contacts that exist with previously positioned elements or with the wall of the volume element V.

This geometrical adaptation is performed in such a manner as to minimize the voids between the current digital element Ci after deformation and the items with which it is put into contact. In this example the packing module 1B does this voxel by voxel, thereby making it easy to perform various types of geometrical deformation on the current digital element Ci so as to adapt it accurately to the pattern of the items already in position in the volume element V.

More precisely, when processing a voxel VOX of the current digital element Ci, the packing module 1B determines whether it can lower this voxel vertically through a level equivalent to the descent step size, in other words, whether the location that would be taken up by the voxel as a result of being lowered is available and not already occupied by a voxel of a digital element Cj that has already been positioned or by the bottom wall of the volume element V.

In the presently-described implementation, if a digital element has a portion that is to come into contact with a side wall of the volume element V (and pass through it), it is cut off, in other words the voxels corresponding to this portion are not taken into consideration.

If the packing module 1B detects the presence of the bottom wall of the volume element V or detects the presence of a voxel of some other digital element Cj at this location, the voxel VOX is maintained at its preceding level, in other words it is maintained above the voxel occupied by the digital element Cj and in contact with this voxel of the digital element Cj.

Otherwise, the voxel VOX is lowered by one voxel.

This operation is performed by the packing module 1B for each voxel of the digital element Ci.

FIGS. 6A to 6D are two-dimensional diagrams in the X,Z plane showing how various digital elements C1 to C4 are positioned and geometrically adapted.

Figure 6A:
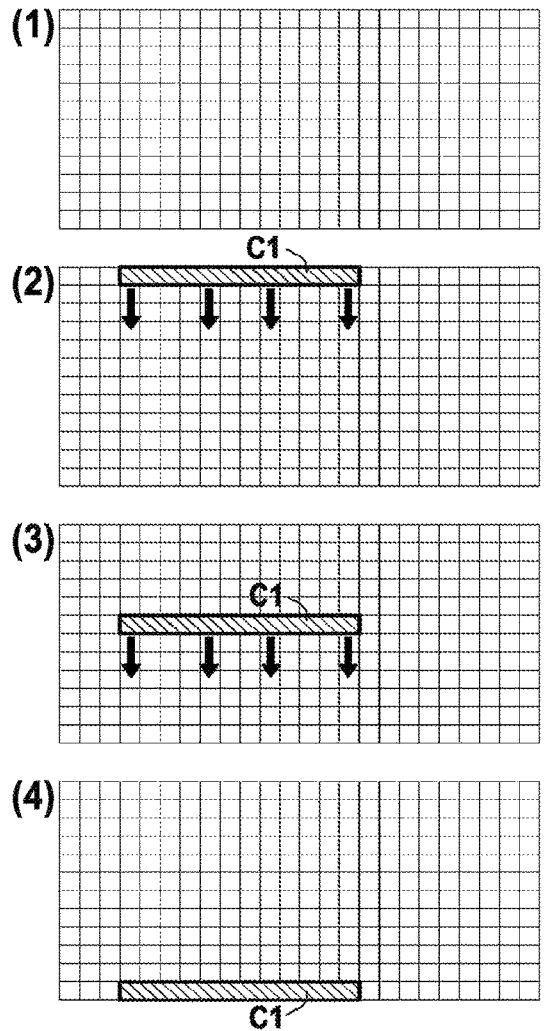
FIGS. 6A-6D show examples of how digital elements are positioned in accordance with the invention.

FIGS. 6A(1) to 6A(4) show the positioning in the volume element V of a first digital element C1, at various iterations during the lowering of the digital element C1. The volume element V shown in FIG. 6A(1) does not contain any other previously-positioned digital element so the digital element C1 is put into contact with the bottom wall of the volume element V, as shown in FIG. 6A(4). In other words, in this situation, geometrical adaptation consists in maintaining the digital element C1 unchanged (there is no geometrical deformation of the element).

Figure 6B:
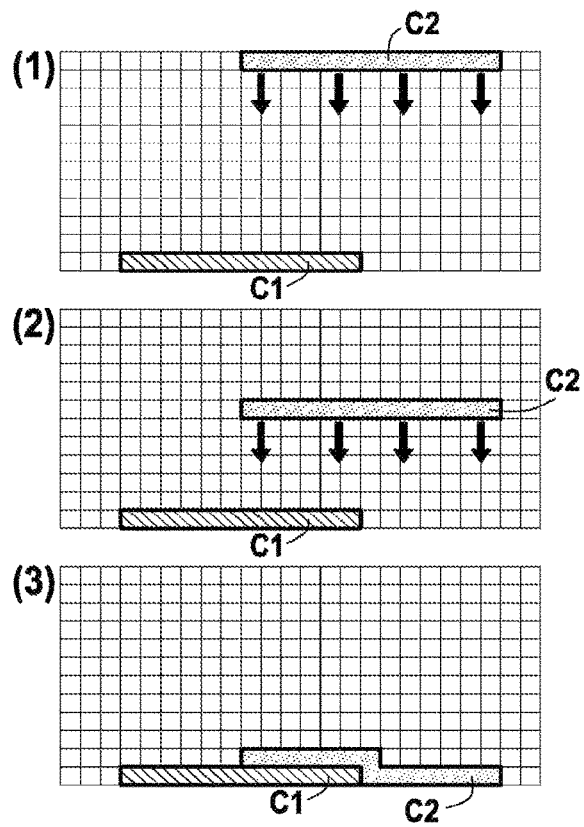

FIGS. 6B(1) to 6B(3) show the positioning of a second digital element C2 in the volume element V, at various iterations during the lowering of the digital element C2. The volume element V shown in FIG. 6B(1) already contains the previously-positioned digital element C1.

While it is being lowered, the element C2 comes into contact with a portion of the bottom wall of the volume element V as shown in FIG. 6B(3) and also with a portion of the digital element C1. While coming into contact, the geometrical shape of the element C2 is adapted to the geometrical pattern of the wall and of the portion of the digital element C1 with which the element C2 is in contact.

FIG. 8 shows more precisely how this adaptation is performed in the particular implementation described herein.

Because of the presently-described voxel by voxel processing, two subsets of distinct voxels given references C2-1 and C2-2 in FIG. 8 are positioned at different levels in the grid of the volume element V, in other words in planes in three-dimensional space that are offset vertically relative to each other, specifically by one voxel in this example (nevertheless, this number depends on the configuration of digital elements that have already been positioned). This positioning on two levels corresponds to geometrical deformation of the digital element and it represents in discrete terms the deformation of the fiber chip to adapt to the presence of other fiber chips, as occurs during fabrication of the material.

Figure 8A:
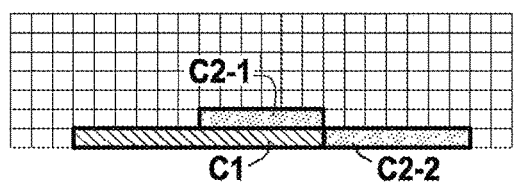
FIGS. 8A-8C show an example of how a digital element is geometrically adapted during the reconstruction method.
Figure 8B:
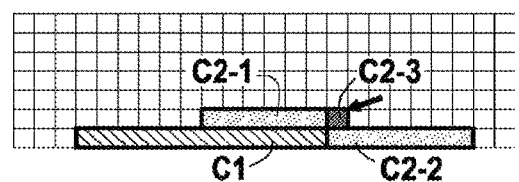

Nevertheless, it should be observed that in the state shown in FIG. 8A, there is a discontinuity between the two subsets C2-1 and C2-2. This discontinuity does not correspond to any real physical phenomenon in the tangling of the fiber elements of the composite material 3. Thus, in the presently-described implementation, in order to ensure continuity of the digital element C2 after deformation, a link voxel C2-3 is inserted between the two subsets, as shown in FIG. 8B.

In a variant, if the two subsets C2-1 and C2-2 are offset vertically by more than one voxel, a plurality of link voxels C2-3 may be inserted to connect together the two subsets.

Inserting one or more link voxels artificially increases the length of the digital element C2. This increase can have an influence on the mechanical behavior of the RVE in response to certain loads, if the increase is not negligible compared with the length of the element.

In order to limit this influence, in the presently-described implementation, after geometrically adapting the digital element C2, the packing module 1B determines whether the adaptation is in compliance with a predetermined criterion concerning increasing the length of the digital element C2 (step F60).

If the adaptation is not in compliance with that criterion (response "no" to test step F60), then the packing module 1B eliminates the digital element C2, in other words this element does not contribute to packing the volume element V (step F70).

The criterion may have various forms. In the example shown in FIG. 8, it may consist in particular in determining whether the planes in three-dimensional space containing the two voxel subsets C2-1 and C2-2 are offset vertically by some number of voxels that is greater than a predetermined number, with the digital element C2 being eliminated, where applicable. This predetermined number may be selected to be equal to 1, for example.

In a variant, it may depend on the initial length of the digital element C2 prior to deformation.

Naturally, other criteria could be envisaged, such as for example comparing the length of the element C2 before and after deformation, etc.

It should be observed that adding the step F60 and a compliance criterion for the geometrical adaptation provides a lever on the out-of-plane properties of the composite material 3 (in other words in this example on the properties of the material that occur in a plane that is different from the X,Y plane), even though not explicitly specified by the assumptions for drawing digital elements used by the reconstruction method of the invention (i.e. drawing a position and an orientation in the X,Y plane). By means of this step, the reconstruction method of the invention also controls the ratio of fiber elements (i.e. digital elements) that are piled out-of-plane.

If the geometrical adaptation performed in step F50 is in compliance with the criterion (response "yes" to test step F60), the packing module 1B in the presently-described implementation performs an optional step F80 of smoothing the surface of the digital element C2 after adaptation. This smoothing step seeks to modify the post deformation surface of the digital element C2 a little so as to make it closer to the physical reality of fiber elements making up the composite material 3. Where applicable, it is performed during the deformation(s) to which the digital element C2 is/are subjected.

More precisely, in the example shown in FIG. 8, because of the discretization, the digital element C2 presents "corners" after it has been deformed (marked by an arrow in FIG. 8B), which corners are not representative of the real deformation of a fiber element of the composite material 3. In order to mitigate this inaccuracy, the surface of the digital element C2 is smoothed by the packing module 1B at the deformation to which the digital element C2 has been subjected, i.e. at the link voxel C2-3 inserted between the subsets C2-1 and C2-2 and forming part of the digital element C2 that has been subjected to deformation.

Figure 8C:
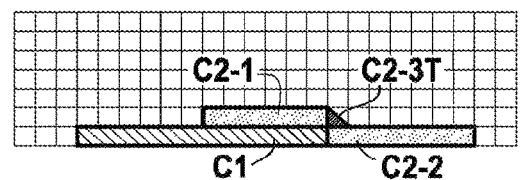

This smoothing is performed by truncating the link voxel C2-3 on a diagonal plane of that voxel, as shown diagrammatically in two dimensions in FIG. 8C. This truncation results in a truncated voxel C2-3T.

Figure 6C:
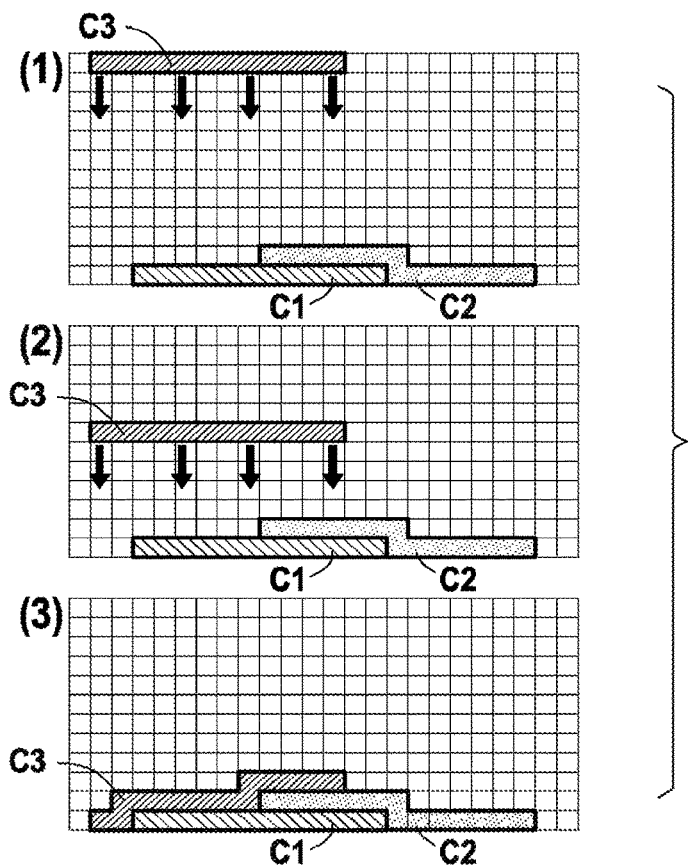

FIGS. 6C(1) to 6C(3) and 6D(1) to 6D(3) show respectively the positioning by the packing module 1B of two other digital elements C3 and C4 in the volume element V while taking account of digital elements that have already been positioned.

Thus, with reference to FIG. 6C(3), the shape of the digital element C3 is geometrically adapted to the pattern of the digital elements C1 and C2 and to the bottom wall of the volume element V, with a plurality of portions of the digital element C3 being subjected to deformation.

Figure 6D:
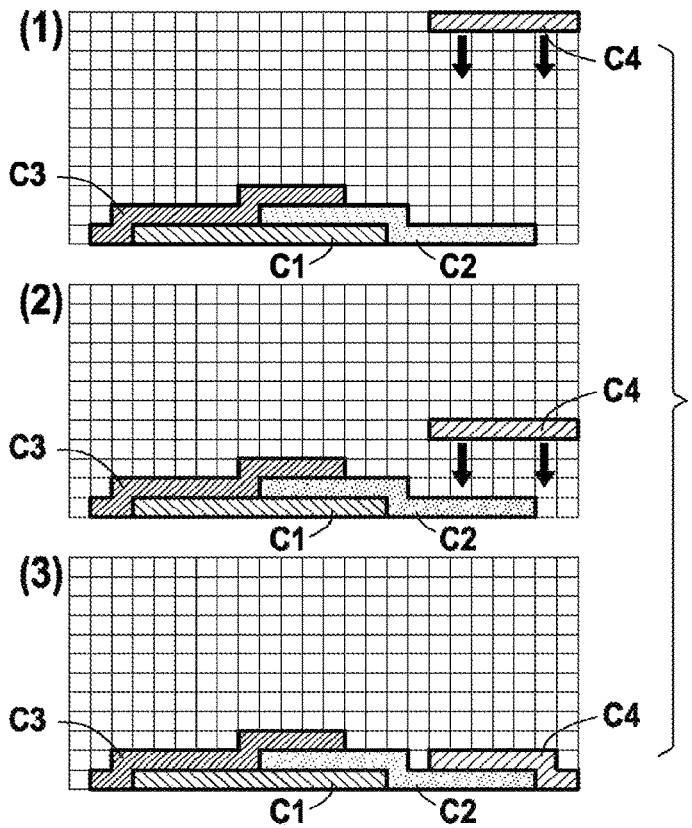

With reference to FIG. 6D(3), the shape of the digital element C3 is geometrically adapted to the pattern of the digital element C2 only, and to the presence of the bottom wall of the volume element V.

FIG. 6D(3) thus shows that the volume element V as packed in accordance with the invention by the packing module 1B minimizes voids between the digital elements.

Specifically, it can readily be understood from the above that unlike the state of the art, the invention is not restricted during geometrical adaptation of the digital element Ci to inclining the longitudinal axis of a portion of that element relative to its main axis Δi. Other geometrical deformations can be envisaged for certain digital elements so as to minimize the presence of voids between digital elements. No limit is associated a priori with the type of deformation that can be envisaged.

Steps F30 to F80 are performed by the packing module 1B for a plurality N of digital elements (step F90 verifies a stop criterion for the method).

The number N may be a predetermined integer.

In a variant, it may depend on satisfying a criterion for packing the volume element V.

In yet another variant, the packing module 1B stops packing the volume element V when it detects that it is no longer managing to position digital elements in the volume element V and/or managing to adapt their shapes to the digital elements that have already been positioned.

In the presently-described implementation, it is assumed that the positions of the digital elements C1, . . . , CN are uniformly distributed in the plane P0 during the step F30. On the basis of this assumption, it is possible that a plurality of digital elements that are considered in succession by the packing module 1B are associated with positions that are situated in the same zone of the plane P0 so that it can be difficult for the packing module 1B to position these digital elements in the bottom of the volume element V (or in some other zone depending on where this phenomenon occurs), thus leaving numerous voids between the digital elements.

In order to mitigate this problem, on detecting that such a situation has occurred (a predetermined event in the meaning of the invention), the spatial distribution relationship used for determining the position of a digital element may be reevaluated so as to take account of the positions in the plane P0 of the digital elements that have already been positioned, in other words of their spatial distribution in the plane P0.

In the presently-described implementation, after the volume element V has been packed, the packing module 1B performs a post-processing step on the packed volume element V (step F100).

This post-processing step comprises inserting interface elements between the various digital elements that have been positioned and put into contact in the volume element V, which interface elements are of predetermined thickness representing the existence of cohesive elements (resin) between the fiber chips constituting the composite material 3. While loading the RVE (cf. step E30 in FIG. 1), these interface elements then make it possible to simulate loss of cohesion between fiber elements of the composite material as can appear, under the effect of shear in the X,Y plane, in particular. More precisely, the interface elements make it possible to model the matrix and interaction between the fibers. It should be observed that it is possible in theory to envisage these interface elements having zero thickness. Nevertheless, that runs the risk of giving rise to calculation artifacts in the finite element modelling. Consequently, the thickness of the interface elements added by the packing module 1B in the zones of contact between the digital elements is preferably selected to be small so as to comply with a high fiber packing ratio of the composite material 3, while nevertheless avoiding such artifacts. By way of example, this thickness may be selected to be less than 1% of the mean size of a voxel.

Preferably, the structure of the voxelization is adapted initially in order to take these interface elements into account.

At the end of this post-processing step, the volume element V as obtained in this way constitutes a representative volume element 2 of the microstructure of the composite material 3 (step F110). Because of the invention, it can present a high packing ratio for the fiber elements, of the order of 98% to 99%.

In addition, it is advantageously already discretized and, as described above, it can then be subjected to various predefined loading situations (e.g. shear, traction, etc.) in order to estimate homogenized properties of the composite material 3 on the basis of its response to such loading (cf. steps E30 to E50 described above with reference to FIG. 1).

To do this, and in known manner, various elastic properties are attributed to the voxels of the digital elements C1, . . . , CN positioned in the volume element (known properties of the fiber elements of the composite material 3), and to the interface elements that are added during the post-processing step F100, and also to the voids present between the digital elements (isotropy properties close to the properties of the resin, and adapted so that the estimate of the response of the RVE is as close as possible to the response of a real sample).

In another implementation, the digital elements C1, . . . , CN and the volume element V are discretized only after packing the volume element, e.g. using a finite element method. In this implementation, the geometrical adaptation is performed by using considerations of Euclidean geometry known to the person skilled in the art.

As mentioned above, the invention has a preferred application in reconstructing a representative volume element of a microstructure of a DFC composite material. Nevertheless, it is not limited to this type of composite material and can easily be used for other composite materials, such as for example composite materials of the BMC or SMC type.

The invention claimed is:

1. A computer-implemented method of predicting mechanical properties of a composite material comprising digitally reconstructing a representative volume element of microstructure of the composite material, the method comprising:
   defining a volume element;
   packing the defined volume element with a plurality of digital elements modelling fiber elements of the composite material, each digital element extending longitudinally along a main axis, said packing comprising:
      associating each digital element with a position in a determined plane in three-dimensional space and with an orientation of the main axis of the digital element in the determined plane; and
      successively positioning each digital element in the volume element in compliance with the position and the orientation that are associated therewith, said positioning comprising
         putting the digital element into contact with at least one of a wall of the volume element or at least one previously-positioned digital element, and geometrically adapting the digital element to at least one of said wall or said at least one previously-positioned digital element with which the digital element is in contact, wherein at least a portion of a digital element used for packing the volume element is subjected during the geometrical adaptation to a deformation other than having a longitudinal axis of the digital element inclined relative to the main axis of the digital element, wherein the geometrical adapting the digital element comprises:

positioning at least two subsets of voxels of the digital element in planes in three-dimensional space that are vertically offset relative to each other, and eliminating the digital element from the volume element if the planes in three-dimensional space are vertically offset by a number of voxels that is greater than a predetermined number.

2. The method according to claim 1, further comprising discretizing the volume element and each digital element in uniform manner into a plurality of voxels.

3. The method according to claim 2, wherein the geometrically adapting the digital element is performed by separately processing each voxel of the digital element.

4. The method according to claim 1, wherein the geometrical adapting comprises, prior to positioning a said subset of voxels in a said plane in three-dimensional space, prior verification that there exists at least one voxel in said plane that is not occupied by a voxel of a previously-positioned digital element or by the wall of the volume element, said non-occupied voxel being vertically in alignment with a voxel of said subset of voxels.

5. The method according to claim 1, wherein at least one voxel of said subset is in contact with a voxel of a digital element that has already been positioned or with the wall of the volume element.

6. The method according to claim 1, further including inserting at least one link voxel between the two subsets of voxels.

7. The method according to claim 1, further including smoothing the surface of at least one digital element put into contact with a previously-positioned digital element in the volume element and having at least one portion that has been subjected to deformation during the geometrical adaptation, said smoothing being performed at the deformation.

8. The method according to claim 7, wherein, when the digital element is discretized into a plurality of voxels, the smoothing comprises truncating at least one voxel of said at least one portion that has been subjected to deformation, the voxel(s) being truncated on a diagonal plane thereof.

9. The method according to claim 1, further including post-processing the volume element comprising inserting an interface element of predetermined dimensions between at least two contacting digital elements in the volume element.

10. The method according to claim 1, wherein the positions associated with the digital elements during the association step are selected to have uniform spatial distribution, said uniform distribution being adjusted on detecting a predetermined event as a function of the spatial distribution of the previously-positioned digital elements.

11. A non-transitory computer readable storage medium storing a computer program including instructions for executing steps of the digital reconstruction method according to claim 1.

12. A device for digitally reconstructing a representative volume element of microstructure of a composite material, the device comprising:

a definition module for defining a volume element; and a packing module suitable for packing the defined volume element with a plurality of digital elements modelling fiber elements of the composite material, each digital element extending longitudinally along a main axis, the packing module being suitable for:

associating each digital element with a position in a determined plane in three-dimensional space and with an orientation of the main axis of the digital element in the determined plane; and successively positioning each digital element in the volume element in compliance with the position and the orientation that are associated therewith, the packing module being suitable during said positioning for putting the digital element into contact with at least one of a wall of the volume element or at least one previously-positioned digital element, and for geometrically adapting the digital element to at least one of said wall or said at least one previously-positioned digital element with which the digital element is in contact, wherein at least a portion of a digital element used for packing the volume element is subjected during the geometrical adaptation to a deformation other than having a longitudinal axis of the digital element inclined relative to the main axis of the digital element, and wherein the geometrically adapting the digital element comprises:

positioning at least two subsets of voxels of the digital element in planes in three-dimensional space that are vertically offset relative to each other, and eliminating the digital element from the volume element if the planes in three-dimensional space are vertically offset by a number of voxels that is greater than a predetermined number.

* * * * *